United States Patent Office 3,187,565
Patented June 8, 1965

3,187,565
APPARATUS FOR MEASURING OSCILLATION AMPLITUDES, PARTICULARLY IN DYNAMIC MATERIAL-TESTING MACHINES
Heinz Kreiskorte, Darmstadt, and Hans-Dieter Weber, Bickenbach, Germany, assignors to Carl Schenck Maschinenfabrik G.m.b.H., Darmstadt, Germany, a corporation of Germany
Filed June 9, 1961, Ser. No. 116,037
Claims priority, application Germany, June 11, 1960, Sch 28,010
13 Claims. (Cl. 73—67.3)

The invention relates to apparatus for electrically measuring or regulating the amplitude of mechanical oscillations translated into corresponding electric oscillations by means of a balanceable electric circuit, such as a bridge network, operating on a compensating principle and energized by an auxiliary voltage, such as a carrier-frequency voltage, direct voltage or chopped direct voltage. In a more particular aspect, the invention relates to apparatus of the just-mentioned type for use in dynamic material-testing machines.

When measuring and regulating forces, deformations and other test data in dynamic material-testing machines or the like oscillatory equipment, the peak value of the oscillatory load is usually taken as a measuring criterion. The devices heretofore employed for such measuring or regulating purposes usually consist of elastic bodies which, due to the oscillatory loading, become deformed within their range of elastic deformation and which actuate an optical system, for example a mirror, in accordance with such deformation. The mirror is used to periodically move a beam of light serving as a pointer. With rapid dynamic loads, the resulting indication constitutes an illuminated band from which the peak forces can be determined.

Another known apparatus used in hydraulic testing machines involves the principle that at the particular peak loads a valve actuated in synchronism with the testing frequency connects a manometer for a short interval of time to the hydraulic pressure acting upon the testing cylinder of the hydraulic machine.

Also known are apparatus operating on an electrical principle with the aid of resistive, inductive or capacitive transducers. In most cases of this type, a bridge network is used for operation on a compensating principle. The bridge network is so adjusted as to be balanced at a peak value of the testing load which can be observed optically on a cathode-ray oscillograph. Such apparatus afford high measuring accuracy unaffected by fluctuations in energizing voltage or variations in amplifying gain, since the measuring result depends only upon the measuring-data transducer and the setting of the compensating member, for example a compensating resistor, of the bridge network. The known electrical apparatus of this type measure either the upper peak value of testing force or the lower peak value, it being also possible to determine the values of the maximum and minimum force successively during different testing periods.

It is an object of the invention to provide improved testing equipment generally of the above-mentioned compensating type, that affords measuring and observing both the upper and lower limits of testing force simultaneously.

Another object, subsidiary to the one just mentioned, is to afford a virtually instantaneous regulation of the testing machine as to upper and lower force limits, particularly in cases where it is desired to keep the median value of testing force as well as the dynamic or periodic force component constant, or if the machine is to be controlled in accordance with a predetermined testing program.

In accordance with a feature of the invention, the apparatus compensating electric measuring of a material-testing machine is provided with periodic electric switching means controlled in synchronism with the frequency of the mechanical oscillations to be investigated and operative to alternately connect compensating means for positive and negative amplitudes respectively to the electric measuring network during the positive and negative half-waves of the oscillations. The compensating means thus alternately connected to the measuring network may consist of variable resistors, inductivities, capacitors or other circuit components, depending upon the type of transducers used for translating the amplitudes of mechanical oscillation into corresponding electrical magnitudes.

According to another feature of the invention, the adjustment of the desired oscillation amplitudes with the aid of the compensating means is facilitated by connecting the output terminals of the measuring network, if necessary through an amplifier, with a demodulator whose output circuit is alternately connected under control by another periodic switch, also operating in synchronism with the frequency of the oscillations, with signal transforming devices which act upon the input stage of a device for regulating the drive of the mechanical oscillation generator and for adjusting the median force of the mechanical oscillations. The just-mentioned regulating devices may consist of conventional components known for the purpose of regulating the dynamic and static components of an oscillation, such as diffential relays, electronic tube circuits, transistor circuits and the like.

According to another, more specific, feature of the invention, the above-mentioned switch or switches that are actuated in synchronism with the frequency of the mechanical oscillation, consists of voltage chopper devices energized through amplifiers in synchronous dependence upon the oscillation frequency.

It is preferable to afford or facilitate checking the electric adjustment by connecting a measuring or indicating device, preferably a cathode-ray oscillograph, to the output terminals of the adjusting measuring network, if necessary through an amplifier.

While the apparatus according to the invention is particularly favorable for the above-described measuring of dynamic periodic forces, it may also be used for measuring static forces by controlling the above-mentioned periodic switches with a suitable constant frequency.

According to another feature of the invention, the above-mentioned adjusting means comprise potentiometers controlled by punched tapes, punched cards, magnetic tapes or other data carriers of a test-programming device.

In accordance with a further feature of the invention, the adjusting potentiometers are designed as digital devices and are controlled by relays in dependence upon pushbutton keys or by the punched or magnetized tapes or the like data carriers of the above-mentioned program controller. The data carrier may contain a pre-recorded indication not only of the load limits to be applied to the workpiece, but also of the number of load cycles. In this case, an electric counting circuit may be used which, upon attainment of the predetermined number of load cycles, causes the adjusting potentiometers to be set to the next programmed load value while the counting circuit is set to the corresponding number of load cycles. When the testing machine is provided with a slow-acting drive, for example of the hydraulic type, a different load value can be set during each load cycle. In this case, the control pulse for switching the machine to slow testing action is preferably accompanied by a switching pulse for actuating a measuring-circuit selector switch which simultaneously adjusts the adjusting potentiometer to a different setting.

Figure 5:
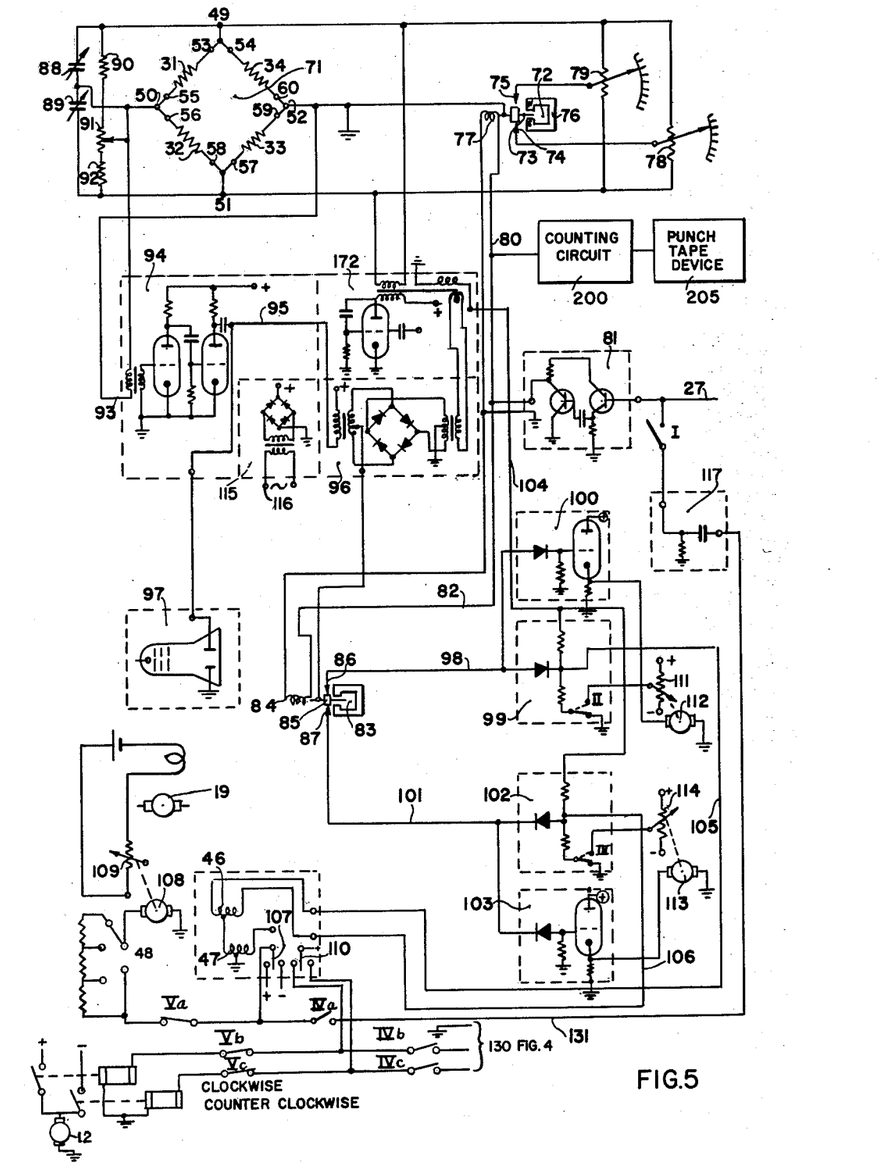
FIG. 5 is a schematic circuit diagram associated with the machinery according to FIGS. 1 and 2.
Figures 6, 12:
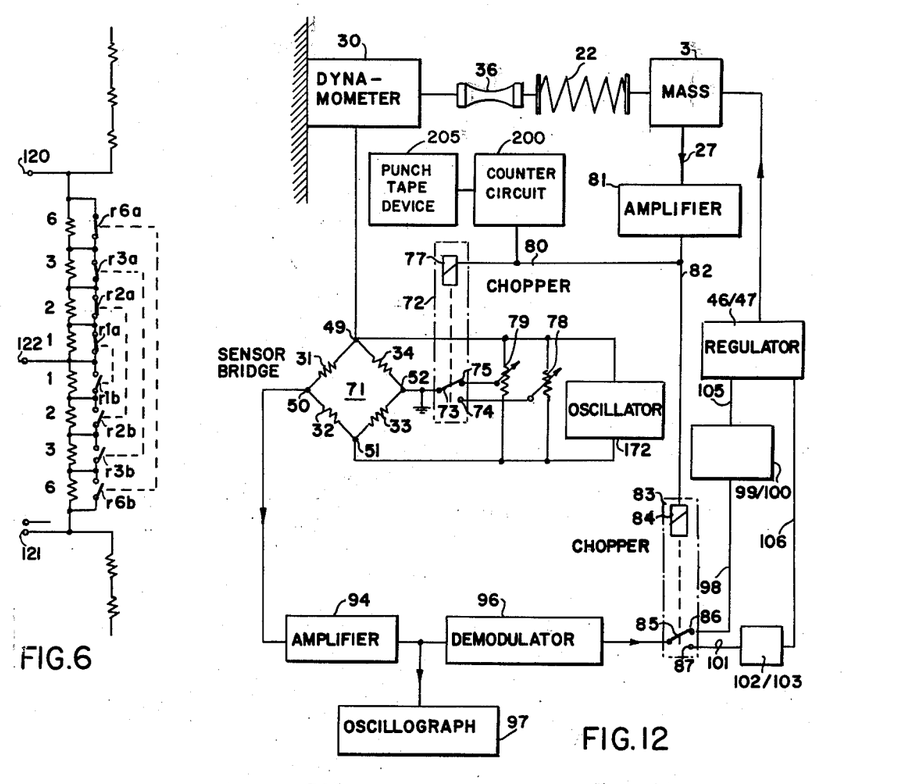
FIG. 6 illustrates schematically a digital-type potentiometer applicable in a circuit diagram otherwise corresponding to FIG. 5.
FIG. 12 is a schematic block diagram corresponding to FIGS. 1, 2 and 3.

Thus, in FIGS. 5 and 12, a counting circuit 200 is connected at its output to the lead 80 connected to windings 77 and 84, respectively, of chopper switches 72 and 83, respectively. The counting circuit 200 may comprise any suitable type known in the art, and is controlled at its input by a punch tape device 205, which functions to control said counting device in accordance with a recorded program. The punch tape device 205 may comprise any suitable type known in the art.

The counting circuit 200 may, for example, control the selector switches 72 and 83 through their windings 77 and 84, respectively, by providing a pulse at a condition determined by the recorded program of the punch tape device 205.

In testing machines with slow-action drive, for example a drive of the hydraulic type or a drive by means of a screw spindle controllable for reversing its revolving motion, a certain amount of time elapses from the release of the switching pulse that controls shifting the machine drive from or to slow action, until the moment where the new setting of the drive becomes effective. This interval of delay can be taken into account by providing for anticipatory action. That is, the pulse for changing the control of the machine drive can be released a given interval of time prior to attainment of the desired maximum testing force.

According to still another feature of the invention, subsidiary to those last mentioned, the machine is provided with a control device which comprises a control motor for varying an electric resistance that determines the above-mentioned duration of the anticipatory interval of time.

In order that the present invention may be readily carried into effect, it will now be explained with reference to the accompanying drawings, wherein.

Figure 1:
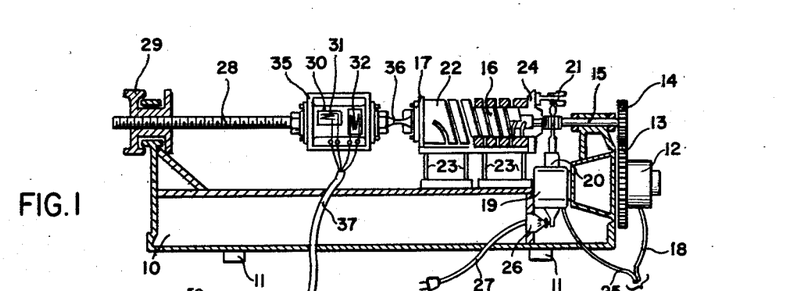
FIG. 1 shows schematically a dynamic material-testing machine provided with drive means for oscillatory testing stress and also with means for varying the median load to which the specimen is subjected.

The material-testing machine 10 according to FIG. 1 is oscillatingly isolated from its foundation by rubber feet 11 upon which the machine structure is mounted. Located at the right-hand side is an electric drive motor 12 for varying the adjustment of the static median load to be imposed upon a specimen. The motor 12 is connected with a screw spindle 15 through spur gears 13 and 14. Depending upon the direction of rotation of motor 12, the spindle 15 is displaced either to the right or to the left. The spindle 15 is connected by a median-force spring 16 of helical shape with a flange structure 17. Depending upon the displacing direction of the spindle 15, a static pushing or pulling force is imposed upon the flange 17. The drive motor 12 is connected by an electric cable with the regulating device shown in FIG. 2 and more fully described below.

Also located at the right-hand side of the testing machine 10 is an electric drive motor 19 for excitation of dynamic oscillations to which the specimen is to be subjected. The motor 19 is connected by a flexible shaft 20 with a centrifugal-force oscillation generator 21. It will be understood that instead of using an oscillatory stress generator of the just-mentioned type, the testing machine may also be provided with the likewise known hydraulic units, crank drives or other means suitable for imposing the desired oscillating stresses upon the specimen. The oscillatory resonance forces excited by the oscillation generator 21 are transmitted to the flange structure 17 by a helical oscillatory-force spring 22. The spring 22 coaxially surrounds the spring 16 and is supported on the bed structure of the machine by spring struts 23 which are free of friction. The spring struts consist essentially of leaf springs. One set of struts is fastened between the bed structure and the flange 17. Another set of such struts is fastened between the bed structure and the flange 24. The drive motor 19 is connected through a cable 25 with the regulating device shown in FIG. 2 and described below.

The motor 19 is provided with a pulse transmitter 26 for measuring its rotary speed. This pulse transmitter may consist of an alternating-current tachometer dynamo, an electric vibration pickup or the like transducer, or an electric contact actuated by a dog on the motor shaft, so as to be closed once for each revolution. The pulse transmitter 26 is connected by a cable 27 with the regulating device of FIG. 2 still to be described.

A spindle 28 extending horizontally in coaxial alignment with the spindle 15 has a threaded portion mounted on the left-hand side of the machine 10. The spindle 28 permits adjusting the machine to the length of the particular specimen to be tested, and for this purpose is provided with a handwheel 29. Attached to the other end of spindle 28 is a dynamometer 30 provided with a cover 35. The specimen 36 to be tested is clamped between the dynamometer 30 and the flange structure 17. Fastened on two opposite surfaces of the dynamometer are four resistive wire strain-gauge strips 31 to 34 (FIG. 3), which are connected in the four respective legs of a bridge network (FIG. 5).

Instead of mounting the gauges on the dynamometer, they may also be mounted on other locations of the testing arrangement, for example directly on the specimen itself. In lieu of strain-gauges, other suitable deformation-responsive sensors or transducers may be used such as those of the inductive or capacitive type. The sensors, here consisting of wire strain gauges 31 to 34, are connected by a cable 37 with the regulating device as shown in FIG. 2.

Figure 2:
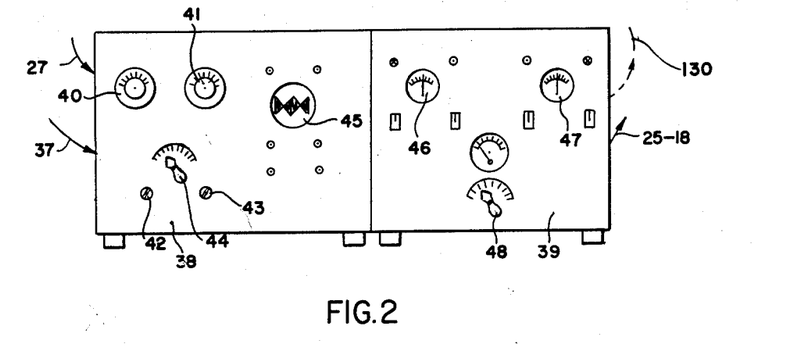
FIG. 2 illustrates measuring control and regulating devices in connection with the testing machine of FIG. 1.

The regulating device, of which only the front panel is shown in FIG. 2, comprises a measuring portion 38 and a regulating portion 39. Located in the measuring portion 38 are compensating potentiometers to be set in accordance with a desired upper limit force and a desired lower limit force to be imposed upon the specimen. The potentiometer for adjustment of the lower limit force is set by means of a knob 40. The potentiometer for setting the upper limit force is set by means of a knob 41. A selector switch 44 permits adjusting the desired amplification factor. Prior to performing a measuring operation, the bridge network of sensors 31 to 34 must be balanced to zero. This is done by operating the knobs 42 and 43, as will be more fully described below with reference to the circuit diagram shown in FIG. 5. The oscillatory time curve of the dynamic forces acting upon the specimen 36 is made visible by means of a cathode-ray oscillograph 45.

The regulating portion 39 of the device (FIG. 2) comprises differential relays 46 and 47 (FIGS. 2, 5). The relay 46 serves for regulating the dynamic drive by means of motor 19. The relay 47 regulates the drive motor 12 serving to adjust or vary the median force imposed upon the specimen. A switch 48 is provided for varying the rate of regulation.

Figure 3:
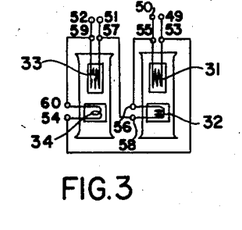
FIG. 3 shows schematically the front and rear sides of a dynamometer which forms part of the machine shown in FIG. 1.

As is apparent from FIGS. 3, 5 and 12, the output terminal 49 of the bridge network is connected with the terminal 53 of the strain-gauge strip 31 and with the terminal 54 of the gauge strip 34. The output terminal 50 is connected with the terminal 55 of the gauge strip 31 and with the terminal 56 of the gauge strip 32. The output terminal 51 is connected with the terminal 57 of gauge strip 33 and with the terminal 58 of gauge strip 32. The output terminal 52 is connected with terminal 59 of the gauge strip 33 and terminal 60 of gauge strip 34.

Figure 4:
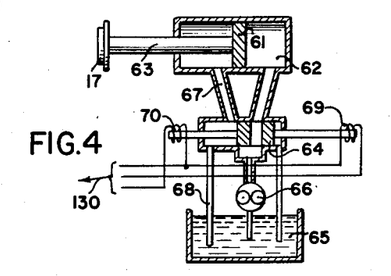
FIG. 4 illustrates schematically a hydraulic slow-action drive applicable in lieu of the dynamic drive shown in FIG. 1.

FIGURE 4 illustrates a hydraulically operating slow-action drive. A piston 61 is displaceable in a hydraulic cylinder 62 and is connected through a piston rod 63 with the flange 17 (FIG. 1). In the illustrated position of the hydraulic control valve 64, the liquid 65 is pressed by a pump 66 into the right-hand chamber of the cylinder 62 so that the piston 61 moves to the left. The liquid contained in the left-hand chamber of cylinder 62 flows through the lines 67 and 68 back into a collecting tank 65. The valve 64 is displaced under control by solenoid coils 69 and 70. These coils are connected through leads 130 with the regulating device 39.

The circuitry of the measuring apparatus 38 and the regulating apparatus 39 (FIG. 2) is shown in FIGS. 5 and 12. The bridge network 71 composed of the four strain gauge strips 31, 32, 33, 34 is energized from an oscillator 172 by carrier-frequency voltage such as an alternating voltage, a periodic direct voltage or a chopped direct voltage. The output leads of the oscillator 172 are connected with the terminals 49 and 51 of the bridge network 71. The oscillator frequency may be approximately 5000 cycles per second, for example.

The terminal 52 of the bridge network is connected with a selector-type chopper switch 72. This switch comprises a movable contact 73 and two fixed contacts 74 and 75. The movable contact 73 forms part of an oscillatingly mounted armature and oscillates in the magnetic field provided by a permanent magnet 76 and by a magnetizing coil 77. Depending upon the direction of the current flowing in coil 77, the movable contact 73 engages either the contact 74 or the contact 75. Connected with contact 73 is the adjusting potentiometer 78 for setting the lower force limit. This potentiometer is adjusted by means of the above-mentioned knob 40 (FIG. 2). The contact 75 (FIG. 5) is electrically connected with the midtap of the adjusting potentiometer 79 for setting the upper force limit. The potentiometer 79 is adjusted by means of the above-mentioned knob 41 (Fig. 2). The coil 77 (FIGS. 5, 12) is connected through a lead 80 with a signal amplifier 81. Also connected to the amplifier 81 through a lead 82 is another periodic chopper switch 83 designed like the above-described switch 72. Depending upon the direction of the current flowing through the switch coil 84, the movable contact 85 is connected either with a fixed contact 86 or a fixed contact 87.

While in the illustrated embodiment, the synchronous operation of the chopper switches is obtained by connecting the amplifier 81 with the mechanical oscillation generator, the amplifier 81 may also be controlled by the sensed or measured oscillatory value itself because the latter is also in synchronism with the testing frequency.

Connected between the terminals 49 and 51 of the sensor bridge network 71 are capacitors 88 and 89, and resistors 90, 91 and 92. These resistors and capacitors, whose respective mid-circuit points are connected with the bridge terminal 50, serve to set the bridge network to zero prior to performing a measuring operation. Such initial zero setting is effected by means of the above-mentioned knobs 42 and 43 accessible on the front panel of the measuring apparatus 38 (FIG. 2).

The terminals 50 and 52 of the bridge network 71 are connected with the input circuit 93 of an amplifier 94 (FIGS. 5, 12). The amplifier, shown schematically, may consist of any suitable carrier-frequency measuring amplifier as known generally for measuring techniques involving wire strain gauges. The terminal 52 of the bridge network 51 is grounded.

The output circuit 95 of amplifier 94 is connected with a demodulator 96 and with the cathode-ray oscillograph 97. The viewing screen of the oscillograph exhibits the demodulated oscillation curve.

The control voltages issuing from the demodulator 96 pass through the chopper switch 83 whose movable contact 85 applies them either through a lead 98 to a control device 99 and a regulating unit 100, or through another lead 101 to another control device 102 and regulating unit 103. The devices 99 and 100 provide for control of the upper limit force. The devices 102, 103 serve for controlling the lower limit force. The control devices 99 and 102 are connected through a lead 104 with the oscillator 172.

The devices 99 and 100 provide supplemental regulation of the attained upper limit force and the devices 102 and 103 for the lower limit force. If the switches II and III are in the illustrated positions, the motors 112 and 113 are without effect upon the control. After switching the contacts II and III into the broken-line positions, the resistors 111, 114 are connected with the control devices 99, 102. When the adjusted load is not attained or not exceeded, then the direct-voltage component contained in the voltage curve according to FIG. 8i causes the motor 112 to rotate, and the tap of resistor 111 is then displaced. If the load reached is below the desired load, the resistance is thus changed in such a sense that the control for the next load change takes place at a later moment so that a higher load will result. As mentioned, this type of switching device is preferably used in conjunction with slow drives, for example, hydraulic drives.

The differential relays 46 and 47 (FIGS. 2, 5) are controlled in dependence upon the oscillator voltage supplied through the lead 104 and also in dependence upon the signal voltages supplied by the leads 98 and 101, these voltages being impressed upon the relays through connecting leads 105 and 106. A relay contact 107 connects a control motor 108 either to the plus or the minus terminal of its direct-current supply. The motor 108 thus runs in one or the other direction and varies the setting of the resistor 109 in the energizing circuit for the field winding of the drive motor 19 that produces the dynamic load to be imposed upon the specimen. Thus, a change in resistance of resistor 109 varies the running speed of the motor 19 and thereby the dynamic load of specimen 36 (FIG. 1). In an analogous manner, the relay contact 110 controls the motor 12 for adjusting the median force.

The system shown in FIG. 5 is further provided with switches I, II, III, IV (IVa, IVb and IVc) and V (Va, Vb and Vc) which are to be actuated when a slow-action drive, for example the above-described hydraulic drive (FIG. 4), is to be used. The switch II connects a resistor 111 into the circuit to provide for a given interval of anticipation. This takes into account the time elapsing between issuance of a pulse for reversing the hydraulic drive to the moment when the reversal becomes effective. The resistor 111 can be set to the proper value by means of a control motor 112. The motor 112 is controlled by the regulating unit 100. If the load attained is greater than the one desired, the regulating unit 100 acts to change the anticipation interval set by means of the resistor 111.

The regulating unit 103 for the lower limit force is likewise provided with a control motor 113 for changing the setting of the resistor 114. The switch III connects the resistor 114 into the circuit. The switch IVa connects a relay contact 107 with a coupling member 117. This coupling member, consisting for example of a resistancecapacitor (RC) member, is connected through the switch I with the amplifier 81.

The direct voltage required for operating the electronic tubes is produced with the aid of a rectifier device 115. This device is connected at its terminals 116 to an alternating current line.

FIG. 6 shows schematically a digital potentiometer applicable in lieu of the adjusting potentiometers 78 or 79 in FIGS. 5 and 12. The terminal 120 is connected with the terminal 49 in FIG. 5, the terminal 121 is connected with terminal 51, and the terminal 122 (FIG. 6) is connected with the contact 75 of the chopper switch 72, assuming that the potentiometer 79 in FIG. 5 is substituted by the digital potentiometer of FIG. 6. If the potentiometer 78 in FIG. 5 is likewise replaced by a digial potentiometer, one of the terminals corresponding to the one denoted by 122 is to be connected with the contact 74 of the chopper switch 72.

Figure 7:
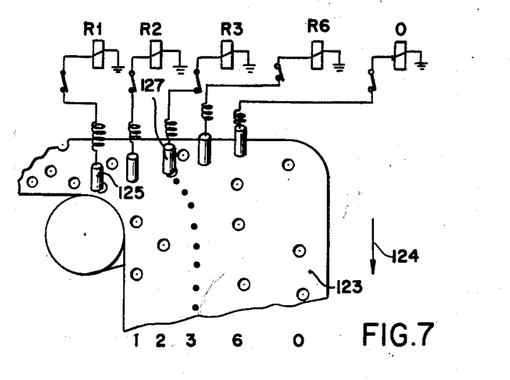
FIG. 7 is a schematic perspective view of a punched-tape device applicable for the control of the digital potentiometer according to FIG. 6.

The digital potentiometer is actuated by the program device shown in FIG. 7. Instead of a punched tape control schematically shown, the actuation of the digital potentiometer may also be effected by punched cards, magnetized tapes or the like data carriers, or by hand. The punched tape 123 travels in the direction indicated by an arrow 124. In the illustrated position of the tape, the contact brushes 125 and 127 receive voltage so that corresponding relays $R_1$ and $R_3$ are energized. The appertaining contacts $r_{1a}$ and $r_{3a}$ (FIG. 6) open, while the contacts $r_{1b}$ and $r_{3b}$ close. The resistors 1 and 3 are then connected between terminal 120 and terminal 122, and the resistors 2 and 6 are connected between the terminals 122 and 121. At a different position of the punched tape, the relays $R_1$ and $R_6$ (FIG. 7) may be energized, for example. In the latter case, the contacts $r_{6a}$ and $r_{1a}$ open while the contacts $r_{1b}$ and $r_{6b}$ close. Now resistors 1 and 6 are connected between terminals 120 and 122, and resistors 2 and 3 are connected between terminals 121 and 122.

As indicated in FIG. 6, the digital potentiometer can be extended upwardly and downwardly in electrical symmetry.

Shown in FIGS 8a to 8i are typical oscillograms as they can be made visible by means of a cathode-ray oscillograph. In these diagrams, the horizontal zero line denotes time. In FIG. 8, the vertical direction indicates force. The diagram in FIG. 8 corresponds to the dynamic forces acting upon the specimen 36.

Figures 8, 8A:
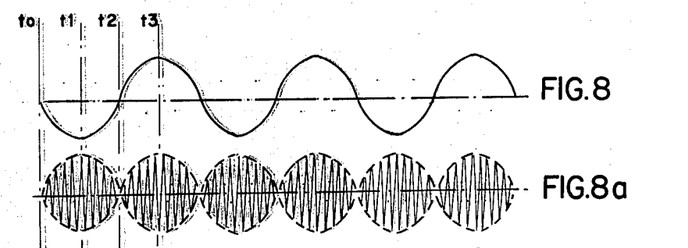
FIGS. 8 to 11 are explanatory diagrams relating to the dynamic alternating forces, control voltages and signal voltages occurring in a system as shown in the preceding illustration.
Figure 8B:
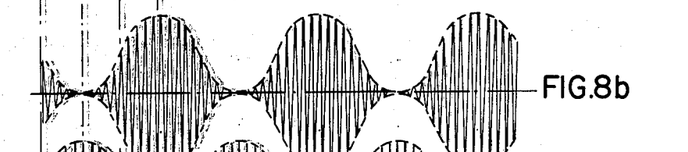

In the diagrams of FIGS. 8a through 8i, the vertical ordinate indicates voltage. The voltage-time curve according to FIG. 8a corresponds to the one taken off the terminals 50 and 52 of the sensor bridge network 71 when the potentiometers 78 and 79 are not switched into the circuits. When only the adjusting potentiometer for the low limit force is switched on and is set for a given maximum value of low-limit force, a voltage time curve according to FIG. 8b is obtained. If $t_0$ in FIG. 8 denotes the commencing moment of the mechanical oscillation and $t_1$ denotes the first oscillation maximum, the first zero passage occurs at $t_2$ and the second maximum at $t_3$. Then the indication visible on the oscillograph is equal to zero at the time point $t_1$ for adjusting of the low-limit load. This means that the magnitude of the load amplitude corresponds to the desired value as adjusted at the adjusting potentiometer 78. The indicated amplitude has the largest value at the moment $t_3$.

Figures 8C, 8D:
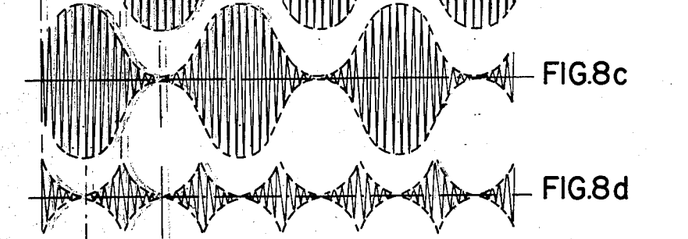

The diagram of FIG. 8c relates to the reverse conditions. In this case only, the potentiometer 79 for adjustment of the upper load is switched on. At the moment $t_1$, the amplitude visible on the screen of the oscillograph is largest. This amplitude reaches the zero line at the moment $t_3$.

When both adjusting potentiometers 78 and 79 are periodically and alternately switched on at the moment $t_2$, i.e. at each zero passage of the dynamic force, then the voltage-time curve according to FIG. 8d is obtained. During the period $T_1$, the adjusting potentiometer for low load is connected through the chopper switch 72 to the sensor bridge network 71, while during the period $T_2$, the adjusting potentiometer for high load is effective. If at the moment $t_1$ or $t_3$ the zero line is not reached, this is an indication of the fact that the dynamic alternating force does not correspond to the desired value. Consequently, the oscillograph affords a simple manner of checking the correct performance of the testing-machine regulation.

Figure 8E:
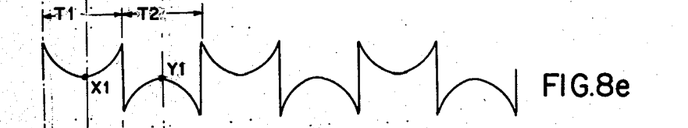
Figure 8F:
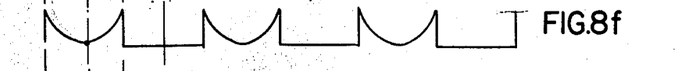
Figure 8G:
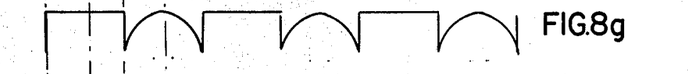
Figure 8H:
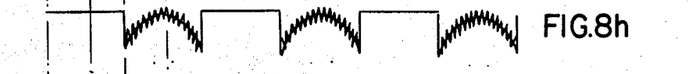

The oscillatory voltage according to FIG. 8d is rectified by means of the demodulator 96. The resulting control voltage appears in the diagram of FIG. 8e. The control voltage for upper load and lower load are supplied by means of the chopper switch 83 through separate leads to the regulating and control devices. For example, the control voltage according to FIG. 8f for controlling the low load is supplied to the control device 102 and the regulating unit 103 through the contact 87 and the lead 101, whereas the signal voltage for upper load, according to FIG. 8g, is supplied to the control device 99 and the regulating unit 100 through the lead 98. In the control device, a carrier frequency can be superimposed upon the control voltages. In this case, the voltage-time curve according to FIG. 8h is obtained. This carrier-frequency voltage is subsequently rectified in the control devices 99 or 102, and the control voltages represented in FIG. 8i are supplied to the differential relay 46 or 48 for regulating the machine driving systems.

In testing machines in which a subsequent correction of the anticipating interval is not necessary, the regulating devices 100, 103 as well as the control motors 112, 113 and the resistors 111 and 114 can be omitted.

Figure 8I:
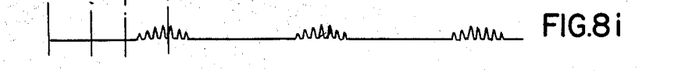

The above-described diagrams of FIGS. 8 to 8i relate to rapid resonance operation of the testing machine, the machine described above with reference to FIG. 1 being suitable for such performance. As mentioned, in rapid operation, the periodic switching from one adjusting potentiometer to the other (78, 79) and the periodic switching between the control and regulating devices for maximum load and minimum load, is preferably effected at the moment $t_3$, i.e. at the zero passage of the alternating force imposed upon the specimen. In a machine operating with a slow drive, for example with a hydraulic drive as described above with reference to FIG. 4, the time interval between two consecutive maximums is not always constant, but depends upon the difference between minimum and maximum load. With such machine drives, therefore, the switching is effected at a constant time point upon attainment of the adjusted force, or upon release of a switch control pulse by the program devices, for example.

Figures 9, 9A, 9E, 10, 11:
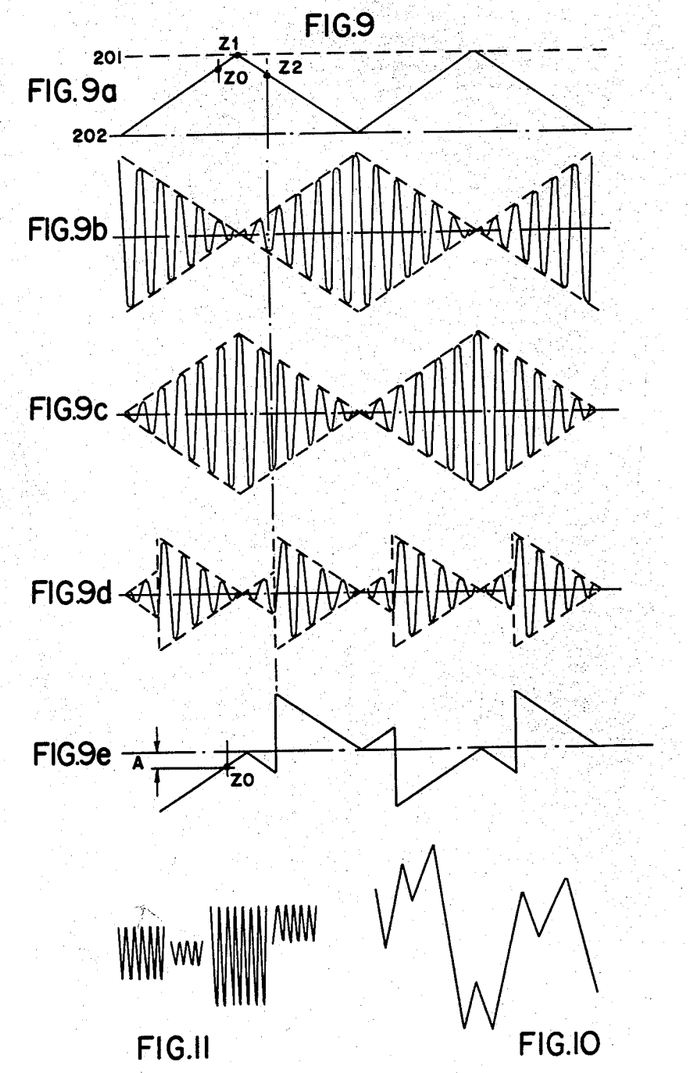

FIG. 9a shows a typical time curve of the dynamic forces occurring with a material-testing machine for the just-mentioned slow operation, and FIGS. 9b to 9e indicate the corresponding electric voltages originating from the force-responsive deformation of the transducer gauges in the measuring bridge. The diagrams of FIGS. 9a to 9e relate to the case in which the desired values for upper-limit force as well as for lower-limit force have been given a predetermined fixed adjustment. The time curve according to FIG. 9a corresponds to the dynamic force imposed upon the specimen 36. At the moment $z_1$, the force attains the desired and preadjusted value 201. However, the control pulse for reversing the hydraulic drive must already be issued at the antecedent moment $z_0$. This anticipatory interval of time is adjusted by means of the resistor 111 or 114. Depending upon the operating mode of the testing machine, the resistance value can be given a fixed adjustment or, as shown in FIG. 5, the adjustment can be varied by the control motors 112 and 113 in order to thus be adapted to the attained testing force.

When the testing force exceeds the adjusted maximum, the control pulse for switching the selector switches 72 and 83 and is issued at the moment $z_2$. The switch control pulse transmitted from the contact 110 through the leads 130 to the control coils 69 and 70 (FIG. 4) of the hydraulic valve is simultaneously issued through the lead 131 to the coupling member 117. In the coupling member 117, the control pulse is passed to the amplifier 81 with delay, due to the capacitors that form part of said coupling member. As a result, the switching of the selector switches 72 and 83 will reliably take place at the moment $z_2$ and not at the moment $z_1$.

The voltage curves in FIGS. 9b and 9c are analogous to the respective curves 8b and 8c. FIG. 9d shows the voltage-time curve as it appears on the screen of the oscillograph when, at the moment $z_2$, the adjusting potentiometers 78 and 79 are switched on by the switch 72. The curve of FIG. 9d results from the two curves 9b and 9c. As described, the measuring voltage according to FIG. 9d is demodulated in the device 96 and is supplied through the selector switch 83 to the control devices 99 and 102.

FIG. 9e shows the time curve of the demodulated voltage. The amount A which determines the moment $z_0$ for the anticipating interval, is adjusted or regulated by means of the potentiometers 111 and 114.

The diagram shown in FIG. 10 relates to a test during which, at each switching, the upper-limit and lower limit forces are newly adjusted, for example by means of a punch-tape programmer according to FIG. 7. FIG. 10, as well as FIG. 11, illustrates an example of a force-time curve as it may be obtained on a testing machine under control by such a programming device.

The performance of a testing plant according to the invention will now be further described with reference to the testing of a workpiece.

The specimen 36 is fastened between the flange 17 and the dynamometer 30, as described above with reference to FIG. 1. The spindle 28 is actuated to adjust the distances between the flange 17 and the dynamometer to the length of the particular specimen used. After the measuring and regulating apparatus is switched on, the rotary knobs 42 and 43 (FIG. 2) are used for changing of the setting of the resistor 91 and of the capacitors 88 and 89, thus balancing the sensor bridge network to zero output voltage. The cathode-ray oscillograph 37 can be used as zero indicator.

For rapid testing operation, such as for fatigue tests, the switches I to V must occupy the respective positions illustrated in FIG. 5. By means of the knobs 40 and 41 (FIG. 2), the upper and lower load values are adjusted at the adjusting potentiometers 78 and 79 (FIGS. 5, 12).

Thereafter, the electric motors 12 and 19 are switched on. The centrifugal-force oscillation generator 21 then imposes dynamic testing forces upon the specimen, and the gear mechanism 13, 14 imposes static testing forces upon the specimen at the same time. When the specimen 36 is subjected to tension (pulling forces), the wire strain gauges 32 and 34 are placed under compressive stress. This causes a corresponding unbalancing of the bridge network 71. The measuring voltage caused by such unbalancing is supplied through the amplifier 94 to the oscillograph 97 and becomes visible on the screen 45.

The same measuring voltage is demodulated in the device 96 and is supplied through the periodic switch or chopper 83 either to the regulating and control set 99, 100 or to the regulating and control set 102, 103. As explained, the set of devices 99 and 100 serves for regulating the upper load, and the set of devices 102, 103 serves for regulating the lower load. The control voltages produced by the devices 99 and 102 are supplied to the differential relays 46 and 47. The contacts of these relays control the dynamic drive effected by motor 19 (FIG. 1) as well as the static setting of the median load by the motor 12. When the load limits preset by means of potentiometers 78 and 79 are attained, no further regulating voltages are produced in the devices 99 and 102. The oscillatory voltage now appearing on the screen of the oscillograph corresponds to the diagram of FIG. 8d. The pulses generated by the tachometer or pickup 26 (FIG. 1), corresponding to the rotating speed of the drive motor 19, are supplied through the lead 27 to the amplifier 81. The pulses are amplified and actuate the chopper switches 72 and 83 in synchronism with the testing frequency.

The magnitude of the oscillatory force is dependent upon the particular type and design of the testing machine being used. In one commercially available design, for example, the oscillatory force can be adjusted from 2.5 to 30 tons (metric) and the median force up to 30 tons. With another machine design, the oscillatory force can be varied from 8 to 60 tons, and the median force up to 72 tons. The frequency of the load cycles is approximately 6000 per minute; and in a machine with slow-action drive is up to 100 load cycles per minute.

When using a testing machine with slow drive, or when switching a dual machine from rapid to slow drive, the switches I to V are to be actuated. For slow action, the clamping of the specimen into the machine is identical with the one used for rapid operation and described above. The control of the hydraulic valve 64 (FIG. 4) is effected through the leads 130 by means of the differential relays 46 and 47 as described above. Furthermore, pulses are issued to the amplifier 81 for actuating the selector switches 72 and 83. These pulses are supplied from the branch lead 131 and through the coupling member 117. The time curve of the forces thus produced is made visible with the aid of the oscillograph 97.

It will be obvious to those skilled in the art, upon studying this disclosure, that the invention permits of a great variety of modifications with respect to mechanical machine design as well as with respect to circuitry and circuit components, and hence can be given embodiments other than particularly illustrated and described herein, without departing from the essential features of the invention and within the scope of the claims annexed hereto.

We claim:
1. Apparatus for electrically measuring the amplitudes of mechanical oscillations, particularly for dynamic testing purposes, comprising a balanceable network of oscillation sensing transducers, two adjusting means for setting said network so as to balance in response to predetermined positive and negative mechanical oscillation amplitudes respectively, periodic selector switch means for alternately connecting said respective adjusting means with said sensor network to periodically balance said network in response to said respective positive and negative amplitudes, said switch means having a control circuit which comprises oscillation responsive means for periodically actuating said switch in synchronism with said mechanical oscillations, and indicator means for indicating the measuring results, said sensor network having an output circuit connected to said indicator means for supplying indicator signal voltage thereto.

2. Apparatus for electrically measuring the amplitudes of mechanical oscillations, particularly for dynamic testing purposes, comprising a bridge network of oscillation sensing transducers, said network having bridge-energizing diagonal points and output leads, an electric oscillator connected to said energizing terminals and having a carrier frequency higher than the frequency of said mechanical oscillations, two potentiometric circuit means connected to said bridge network and being individually adjustable for setting said network so as to balance in response to predetermined positive and negative mechanical oscillation amplitudes respectively, periodic selector switch means alternately connecting said respective potentiometric circuit means with said sensor network to periodically adjusting means for setting said network so as to balance in response to said respective amplitudes, said switch means having a control circuit which comprises voltage supply means responsive to the mechanical oscillations for actuating said switch means at the frequency of said mechanical oscillations, a demodulator connected to said output leads of said bridge network, and indicator means connected to said demodulator for indicating the measuring results in response to the demodulator output voltage.

3. With a dynamic material-testing machine having a mechanical oscillation generator for subjecting a specimen to oscillatory load, the combination of electric apparatus for measuring the oscillation amplitudes of the specimen comprising a balanceable network of oscillation sensing transducers, two adjusting means for setting said network so as to balance in response to predetermined positive and negative mechanical oscillation amplitudes respectively, periodic selector switch means for alternately connecting said respective adjusting means with said sensor network to periodically balance said network in response to said respective amplitudes, said switch means having a control circuit connected to said oscillation generator for actuating said switch means in synchronism with said mechanical oscillations, and indicator means for indicating the measuring results, said sensor network having an output circuit connected to said indicator means for supplying indicator signal voltage thereto.

4. With a dynamic material-testing machine having a mechanical oscillation generator for subjecting a specimen to oscillatory load and having adjusting means for varying the median force imposed upon the specimen, the combination of electric apparatus for measuring the oscillation amplitudes of the specimen comprising a bridge network of oscillation sensing transducers, said network having bridge-energizing diagonal points and output leads, an electric oscillator connected to said energizing terminals and having a carrier frequency higher than the frequency of said mechanical oscillations, two potentiometric circuit means connected to said bridge network and being individually adjustable for setting said network so as to balance in response to predetermined positive and negative mechanical oscillation amplitudes respectively, first periodic selector switch means for alternately connecting said respective potentiometric circuit means with said sensor network to periodically balance said network in response to said respective amplitudes, a demodulator connected to said output leads of said bridge network, voltage-responsive regulators connected to said mechanical oscillation generator and with said median-force adjusting means for regulating the load imposed upon the specimen, second periodic selector switch means connected between said demodulator and said regulators for alternately applying the demodulator output voltage to said respective regulators for controlling said regulators, said first and second switch means having each a control circuit connected to said oscillation generator to operate in synchronism with the mechanical oscillations, whereby the testing machine is regulated for given adjusted load conditions of the specimen.

5. In mechanical-oscillation measuring apparatus according to claim 1, said indicator means comprising a cathode-ray oscillograph.

6. Mechanical-oscillation measuring apparatus according to claim 3, comprising selectively actuable control means connected with said periodic switch means for disconnecting it from said generator to operate said switch means at a desired constant switching frequency for measuring a static force.

7. In mechanical-oscillation measuring apparatus according to claim 1, each of said adjusting means comprising a potentiometer resistance circuit for regulating it, and a programming device connected with one of said potentiometer circuits for changing its adjustment in accordance with a predetermined program.

8. In mechanical-oscillation measuring apparatus according to claim 1, each of said adjusting means comprising a digitally subdivided impedance group, and a programming device having a travelling signal carrier and being connected with one of said impedance group for digitally changing its adjustment in accordance with a predetermined program.

9. In a dynamic material-testing machine and measuring apparatus according to claim 3, said machine comprising means for stopping said oscillation generator, and said adjusting means comprising impedance members, and a programming device having a travelling signal carrier and being connected with said impedance members for changing their adjustment in accordance with a predetermined program, an adjustable counting means connected to said generator stopping means for limiting the oscillatory load of the specimen to a predetermined number of alternations, and means connecting said programming device with said counting means for setting said number under control by said signal carrier.

10. A dynamic material-testing machine according to claim 4, comprising variable resistor means connected with said network independently of said periodic switch means, and control means connected with said variable resistor means for changing its adjustment simultaneously with the switching of said periodic switch means.

11. In a dynamic material-testing machine according to claim 3, said oscillation generator comprising a pulse responsive drive of relatively low speed, said adjusting means comprising an adjustable impedance group, and a programming device having a travelling signal carrier and being connected with said impedance group for changing its adjustment in accordance with a predetermined program, and time control means connected to said drive and controlled by said program device for issuing to said drive a pulse earlier than the time at which the force from said drive is maximum.

12. In a dynamic material-testing machine according to claim 11, said time control means including a time-adjusting resistor.

13. A dynamic material-testing machine according to claim 12, comprising a control motor connected with said time-adjusting resistor for varying its adjustment, and means connected with said motor for controlling it in dependence upon the relation of the load attained to the load preset.

References Cited by the Examiner

UNITED STATES PATENTS

| | | | |
|---|---|---|---|
| 2,693,699 | 11/54 | Federn | 73—92 |
| 2,750,795 | 6/56 | Federn | 73—92 |
| 2,980,837 | 4/61 | Wu | 73—71 X |

RICHARD C. QUEISSER, *Primary Examiner.*

JOHN P. BEAUCHAMP, *Examiner.*